UNITED STATES PATENT OFFICE.

JOHN FARRIS BEDFORD, OF CROWLEY, LOUISIANA, ASSIGNOR OF ONE-HALF TO JOSEPH FLASH, OF SAME PLACE.

COMPOSITION FOR DESTROYING RED RICE, &c.

SPECIFICATION forming part of Letters Patent No. 673,012, dated April 30, 1901.

Application filed September 26, 1900. Serial No. 31,179. (No specimens.)

*To all whom it may concern:*

Be it known that I, JOHN FARRIS BEDFORD, a citizen of the United States, residing at Crowley, in the parish of Acadia and State of Louisiana, have invented a new and useful Composition of Matter to be Used for the Destruction of Red Rice, Water-Grasses, and Field or Farm Weeds of any Name or Description, of which the following is a specification.

My composition consists of the following ingredients, combined in the proportions stated—viz., cotton-seed meal, thirty-six pounds; salt, finely ground, sixty pounds; paris-green, two pounds; blue vitriol, finely ground, one pound; copperas, finely ground, one pound. These ingredients are to be thoroughly minged and mixed by agitation, making one hundred pounds.

In using the above-named composition it should be applied when the soil or ground is damp or wet and should be so placed to come in contact with the roots of weeds to be destroyed or as near to the roots of weeds intended for destruction as possible, which may be done by the hand or with a fertilizing apparatus, or it may be plowed under, or it may be drilled in the ground or soil with a regular planter's drill or a machine properly constructed for such purposes. It should be used from fifty to sixty days before the planting-season. It should not be put any deeper than two inches in ground. It can be successfully applied and used by putting it on top of the grasses or weeds and around the stems of the same in the evening after sunset when the ground is dry. The dew at night will cause it to dissolve, and then it will find its way to the roots, which it will effectively destroy. When the ground is damp or wet, it can be used at any time during the day. To use it on water-grasses in still water where grasses are above the surface of water, it should be put on the top of grasses. If the grasses are below the surface of the water and the composition of matter can be gotten to the roots, it will also effectively destroy those grasses. To be effectively used on water-lilies, it should be put on top of them on a calm day, so the wind does not blow away the matter, and it will kill every one of them inside of five days.

I am aware that the composition of matter is partially poisonous to the water, yet it is not used in sufficient quantities to have any deadly effect on fish, water-fowl, or a human being. It does not injure the soil, as the cotton-seed meal counteracts the injurious effects of the other ingredients and leaves the soil in a much better state after using said compound than before. It stimulates the growth of plants planted from fifty to sixty days after using the compound, and it is a fertilizer and weed-destroyer in every application and sense of those words.

What I claim, and desire to secure by Letters Patent of the United States, is—

1. The herein-described composition of matter consisting of cotton-seed meal, fine-ground salt, paris-green, blue vitriol and copperas, substantially as described and for the purposes specified.

2. The herein-described composition of matter for the destruction and extermination of red rice, field or farm weeds of all names and descriptions, the destruction and extermination of water-grasses and water-lilies, consisting of cotton-seed meal thirty-six pounds, paris-green two pounds, copperas, finely ground, one pound, table-salt, finely ground, sixty pounds, blue vitriol, finely ground, one pound, substantially as described.

In testimony whereof I have signed my name to this specification, in the presence of two subscribing witnesses, this 22d day of September, 1900.

JOHN FARRIS BEDFORD.

Witnesses:
A. E. LORMAND,
JOSEPH FLASH.